J. F. CAMERON.
Plow-Fender.

No. { 105, 31,109. }

Patented Jan. 15, 1861.

Inventor:
John F. Cameron by his atty.
Amos Broadnap

UNITED STATES PATENT OFFICE.

JOSHUA F. CAMERON, OF BEDFORD, MISSOURI.

IMPROVEMENT IN DEVICES FOR SECURING SHIELDS TO PLOWS.

Specification forming part of Letters Patent No. 31,109, dated January 15, 1861.

*To all whom it may concern:*

Be it known that I, JOSHUA F. CAMERON, of Bedford, in the county of Livingston and State of Missouri, have invented a new and useful Improvement in Plows; and I do hereby declare that the following is a full, clear, and exact description of the same, reference being had to the annexed drawings, making part of this specification, in which—

Figure 1:
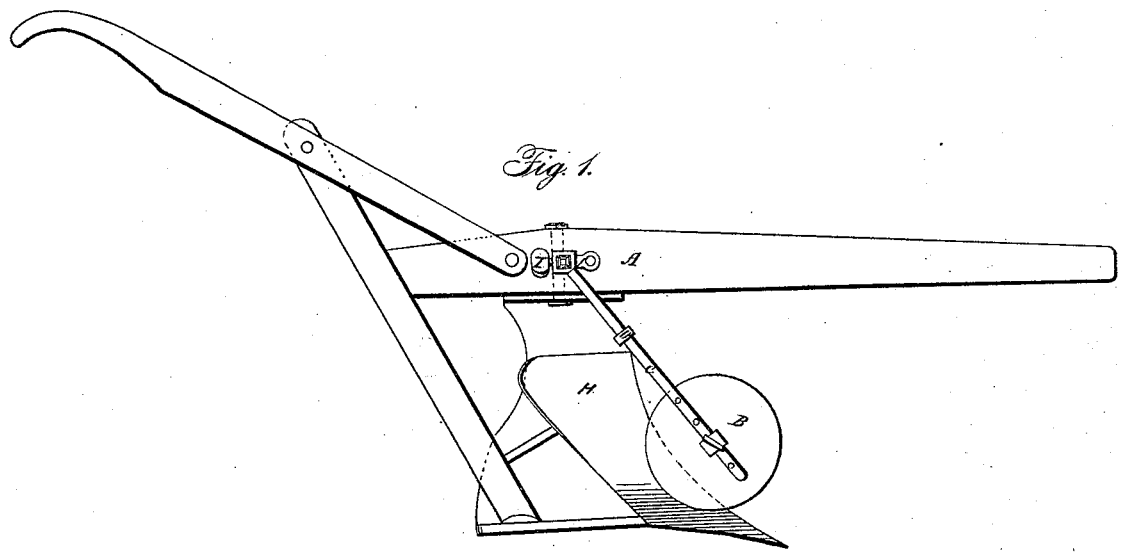
Figure 2:
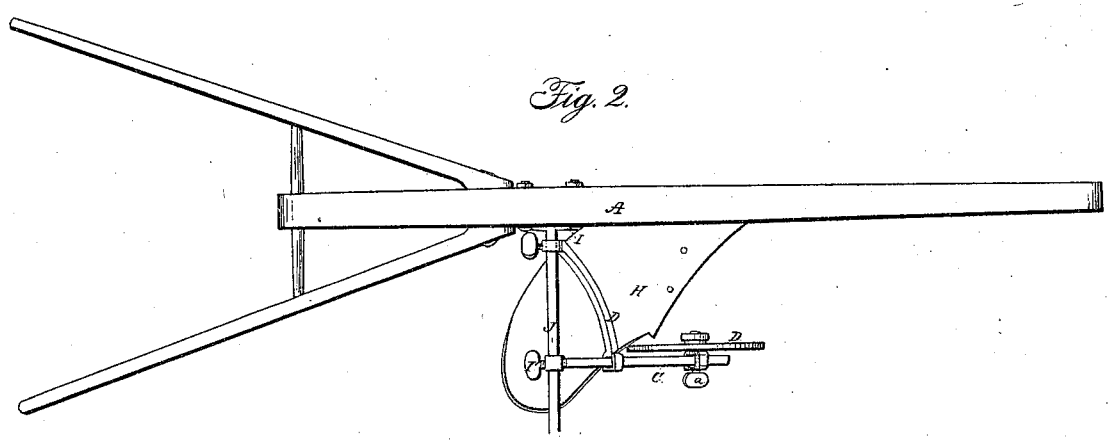

Figure 1 is a top view of my said improvement, and Fig. 2 is a side elevation thereof.

The following description will enable any one skilled in the arts to make and use my invention.

Similar letters of reference represent corresponding parts of the different figures of the drawings annexed.

In using a plow to cultivate plants with, the dirt raises up the mold-board and falls over on the plants, so as to bury them.

The object of my invention is to overcome this objection, which object I propose to and do effect by the use of the following contrivance:

I first fix the arm J against the side of the plow-beam A on a horizontal plane, and upon this arm I fix a second arm, C, upon an oblique plane from the beam to the ground, in the manner shown. These arms I brace against each other by means of the brace D. On the arm C, I fix a revolving disk or shield, B. This shield I fix on the arm of a socket, which is made so as to slide up and down freely on the arm C, and which has a screw, $a$, fixed in it, so as to adjust it in any desired position. The arm C is also made adjustable on the arm J, whereby the shield may be shoved to or from the beam. Now when the plow is in operation the dirt raises up the mold-board, and instead of falling over on the plants falls against the shield B, which in moving forward lets it fall against the base or root of the plant, so that very little hoeing is required.

I claim—

The arrangement of the revolving shield B, adjustable head $a$, and bars C, J, and D, constructed and adjustable in relation to each other in the manner described, for the purpose specified.

JOSHUA F. CAMERON.

Witnesses:
DANL. G. SAUNDERS,
JOHN Y. PORTER.